Jan. 29, 1935.  G. W. VEALE  1,989,178
BUMPER
Filed Oct. 28, 1930
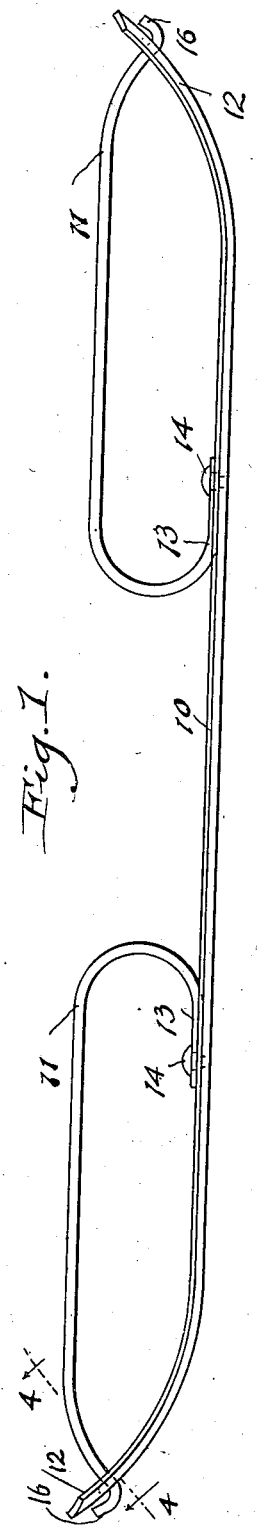
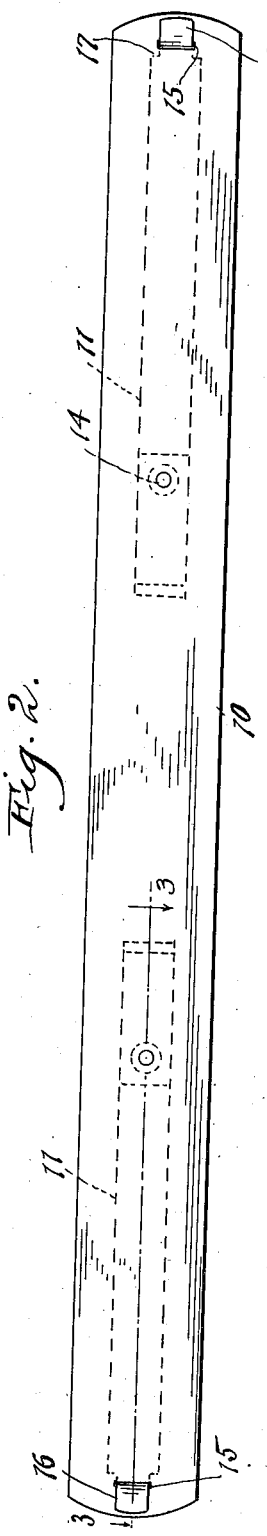
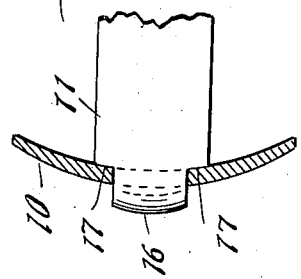
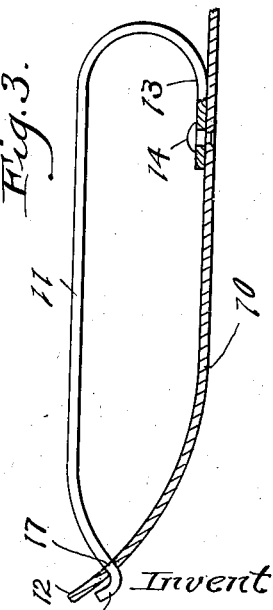
Inventor
George W. Veale
Kwis Hudson & Kent
attys.

Patented Jan. 29, 1935

1,989,178

UNITED STATES PATENT OFFICE 1,989,178

BUMPER

George W. Veale, Cleveland, Ohio, assignor to Eaton Manufacturing Company, Cleveland, Ohio, a corporation of Ohio Application October 28, 1930, Serial No. 491,699

2 Claims. (Cl. 293—55)

This invention relates to vehicle bumpers and as one of its objects aims to provide an improved and simplified construction for devices of this kind.

Another object of this invention is to provide a bumper construction embodying a novel and simplified form of connection between the impact member and the supporting means.

A further object of this invention is to provide a bumper in which the impact member is connected to flexible supporting means by a portion of the latter being extended through the impact member.

The invention may be further briefly summarized as consisting in certain novel combinations and arrangements of parts hereafter described and particularly pointed out in the appended claims.

In the accompanying sheet of drawings

Fig. 1 is a top plan view of a vehicle bumper constructed according to my invention;

Fig. 2 is a front elevation thereof;

Fig. 3 is a sectional view taken on line 3—3 of Fig. 2; and

Fig. 4 is a sectional elevation taken on line 4—4 of Fig. 1.

In the drawing to which detailed reference will presently be made, I have shown my invention embodied in a simple and practical form of bumper, but before proceeding with a detailed description thereof, it should be understood that the principle of my invention may be embodied in bumpers of various forms and designs.

As illustrated in Figs. 1 and 2 of the drawing, my bumper comprises a substantially horizontally extending impact member 10, and flexible members 11 which support the impact member and connect the same to the vehicle. The impact member may be of any desired shape or construction but as herein illustrated, is maintained substantially straight throughout the major portion of its length and at its ends is arcuately curved to form the rearwardly extending bent end portions 12. This member may be formed from any appropriate material, but is preferably formed from a relatively wide bar of spring steel of suitable cross-sectional shape. In this instance, as shown in Figs. 1 and 4 of the drawing the edges of the bar are of tapered thickness and are curved in the same direction so that when this member is supported in place a convex impact surface is presented to the front.

The supporting members 11 are formed from suitable material such as bars of spring steel which are relatively narrow in comparison with the width of the impact member. At their inner ends or, in other words, at the ends thereof which are nearest the longitudinal center line of the vehicle, these members are provided with the reversely bent portions 13 to which the impact member is secured by suitable means, such as the rivets 14.

As a simple and efficient form of connection between the arcuately bent end portions of the impact member and the outer ends of the flexible supporting members 11, I provide the slots or openings 15 adjacent the ends of the impact member in which the connecting means of the supporting members engage. The latter members are identical in shape each being provided with connecting means which is preferably formed as an integral tongue portion 16. I prefer to construct the supporting members with these tongue portions deflected to substantially hook-like form, and then at assembly of the impact and supporting members to hook or insert the previously formed tongues through the openings 15. After the tongues have been hooked or inserted into the openings 15 the members 11 are swung upon the tongues as pivots to bring the reversely bent portions 13 against the back of the impact member and held in that position by the rivets 14. After the impact and supporting members have been assembled as shown in Fig. 1, the arcuately deflected tongues 16 extend along, but preferably out of contact with, the forward side of the impact bar in substantially the same direction as the arcuately bent end portions 12.

It will be noted that in each instance the integral connecting tongue 16 is made somewhat narrower in width than the remaining portion of the supporting member 11, thereby providing shoulders 17 on opposite sides of the tongue. These shoulders form an abutment means which engages the rear side of the impact member and limits the extent to which the connecting means may project through the opening 15.

In constructing the impact member the openings or slots 15 through this member are made of a width only slightly greater than the thickness of the tongues 16 so that when the supporting members are swung toward the impact member, as explained above, the tongues will bind in the openings. The supporting members are preferably made of such shape that this binding action will occur before the reversely bent portions 13 engage the back of the impact member, and further movement of these members toward the impact bar tends to spring or deflect the rearwardly curved end portions 12. This results in the impact members and the supporting members being initially stressed whereby these parts are held tightly in their assembled position without any rattling or chafing therebetween, and without the need of locking pins or clamping devices.

The bumper may be attached to a suitable portion of the vehicle by providing the supporting members 11 with suitable connecting means, or by clamping these members directly to an available portion of the vehicle structure.

In connecting the impact member to the inner ends of the supporting members 11, the rivets 14 are preferably countersunk so that the impact member will present a neat and smooth surface. To enhance the appearance of the bumper the convex surface of the impact member, as well as other portions of the device, may be given a bright or any other desired decorative finish.

It will now be seen that I have provided an attractive bumper which is of an extremely simple form, involving a minimum number of easily constructed parts, and in which the need for connecting clamps, pins or the like between the end portions of the impact member and the supporting means, is entirely eliminated. Moreover, in the bumper which I have devised, the parts employed are not only relatively few in number but are such that they can be readily assembled without need of skilled labor or elaborate shop equipment.

In illustrating my invention, I have shown the supporting means for the impact member as being separate members, but it should be understood that the principle of my invention may also be applied to a bumper in which the supporting means is a single member, and in that case the impact and supporting members would be assembled by inserting the tongues through the openings while one or both of the members is held in a bowed condition.

While I have illustrated and described a device of my invention in a detailed manner, it should be understood, however, that I do not intend to limit myself to the precise details and arrangements of parts illustrated and described, but regard my invention as including such changes and modifications as do not involve a departure from the spirit of the invention and the scope of the appended claims.

Having thus described my invention, I claim:

1. A bumper comprising an impact member having arcuately bent end portions provided with perforations therein, and supporting means having connecting means, extending through said perforations, said connecting means being arcuately bent to extend from said perforation along the front face of said arcuately bent end portions.

2. In a bumper, a front bar having arcuate ends with perforations therein, and a spaced back bar having its ends provided with shoulders to engage one side of the front bar, said ends also having tongue-like extensions through said perforations and bent into substantially parallel relation with the other side of the front bar.

GEORGE W. VEALE.